United States Patent [19]
Aoyama

[11] 3,990,217
[45] Nov. 9, 1976

[54] METHOD OF MECHANICALLY HARVESTING TOMATOES

[76] Inventor: Kenneth M. Aoyama, 803 Mace Blvd., Davis, Calif. 95616

[22] Filed: Aug. 13, 1975

[21] Appl. No.: 604,422

[52] U.S. Cl. .................................. 56/1; 56/327 R; 171/1; 171/14
[51] Int. Cl.² ........................................ A01D 46/00
[58] Field of Search ............ 56/1, 192, 327, DIG. 1, 56/327 R; 171/14, 1, 101

[56] References Cited
UNITED STATES PATENTS

| | | | |
|---|---|---|---|
| 1,823,387 | 9/1931 | Campbell | 56/1 |
| 2,503,416 | 4/1950 | Russell | 56/1 |
| 3,082,588 | 3/1963 | Jay et al. | 56/1 |
| 3,301,331 | 1/1967 | Looker | 171/1 |
| 3,475,886 | 11/1969 | Hart | 56/1 |
| 3,492,796 | 2/1970 | Lundell | 56/1 |
| 3,911,649 | 10/1975 | Scarnato et al. | 56/1 |

Primary Examiner—Russell R. Kinsey
Attorney, Agent, or Firm—Lothrop & West

[57] ABSTRACT

In a tomato field in which the tomato plants are grown in a plurality of substantially parallel rows an apparatus is advanced along a predetermined one of the rows. The apparatus cuts the tomato plants in the row, carries the cut plants rearwardly and discharges them onto a transverse conveyor. The transverse conveyor transfers and deposits the cut plants laterally onto a parallel row of uncut plants in a row located at a predetermined distance from the row being cut, thereby uniting two rows of plants for subsequent harvesting by a mechanical tomato harvester.

By advancing the apparatus to and fro across the field in a predetermined pattern, an unobstructed avenue is provided for the movement of a bulk trailer accompanying the mechanical tomato harvester in the subsequent harvesting process.

The method and apparatus are also used to advantage in the mechanical harvesting of other row crops, such as melons and the like. Thus, both in the title and elsewhere in the application, wherever the words tomato or tomatoes are used, it is to be understood that the method and apparatus are equally applicable for use with other compatible field crops.

18 Claims, 5 Drawing Figures

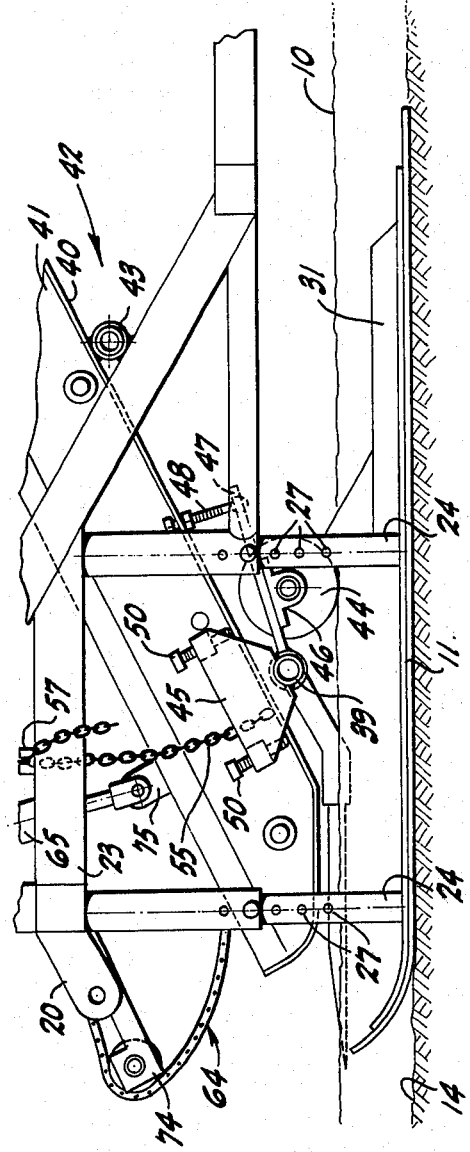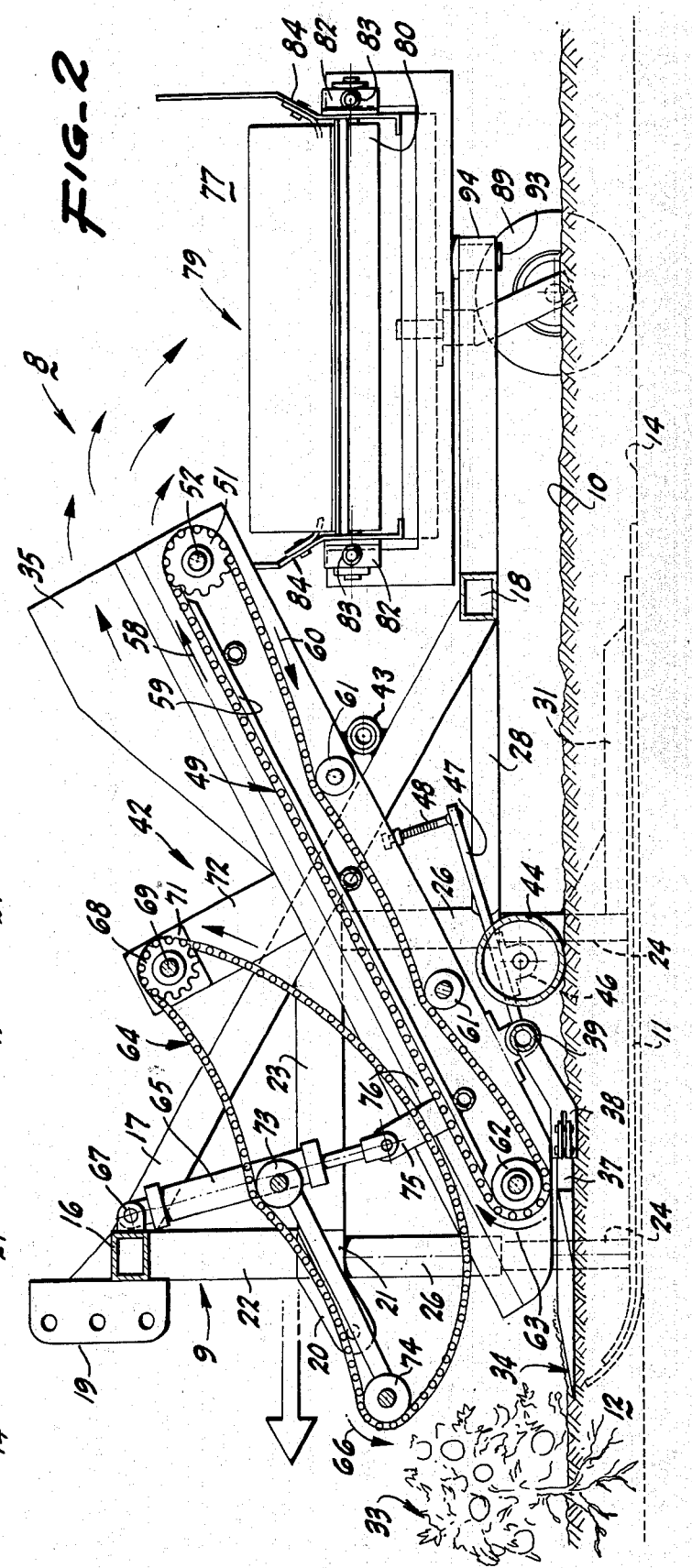

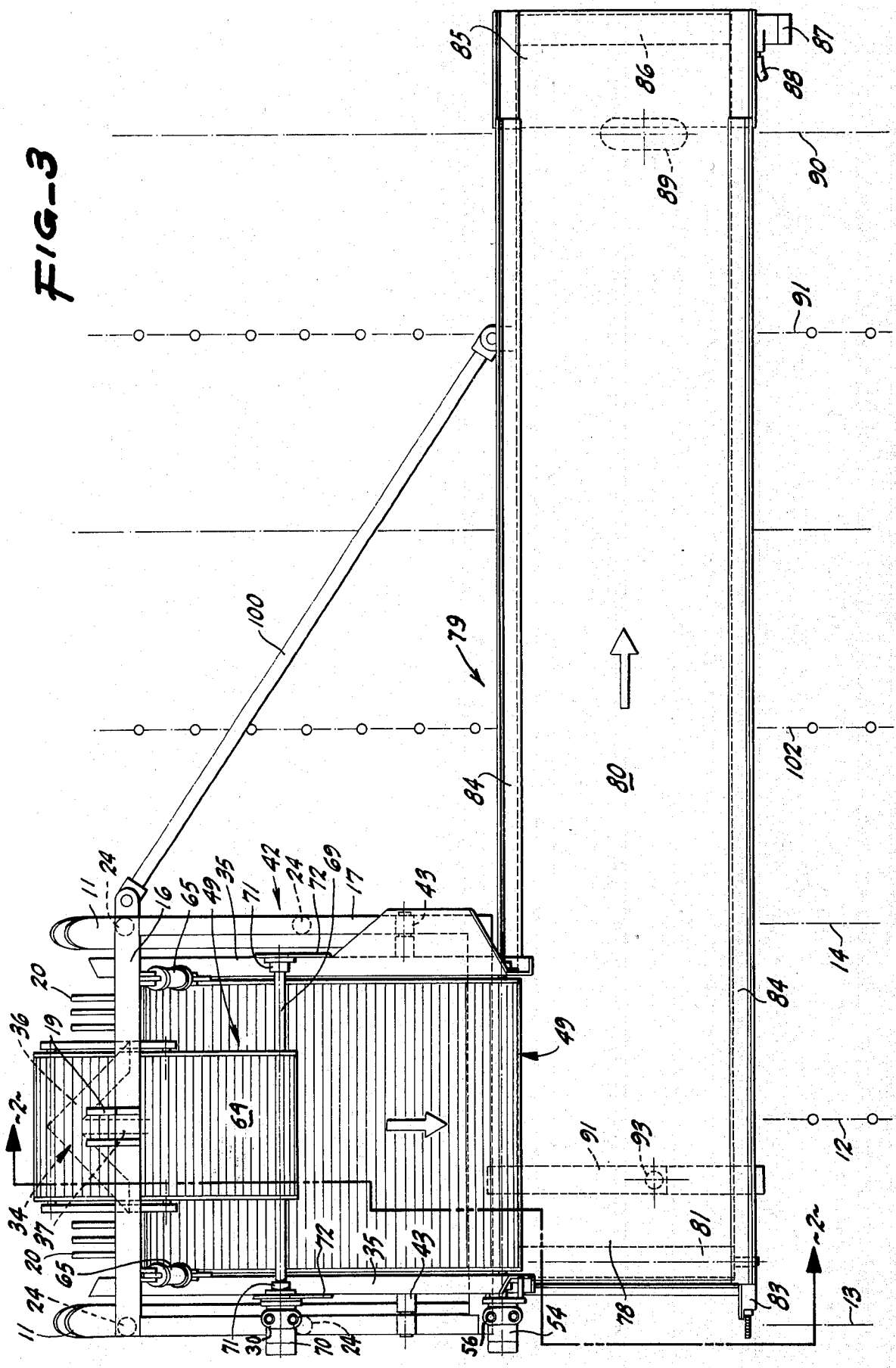

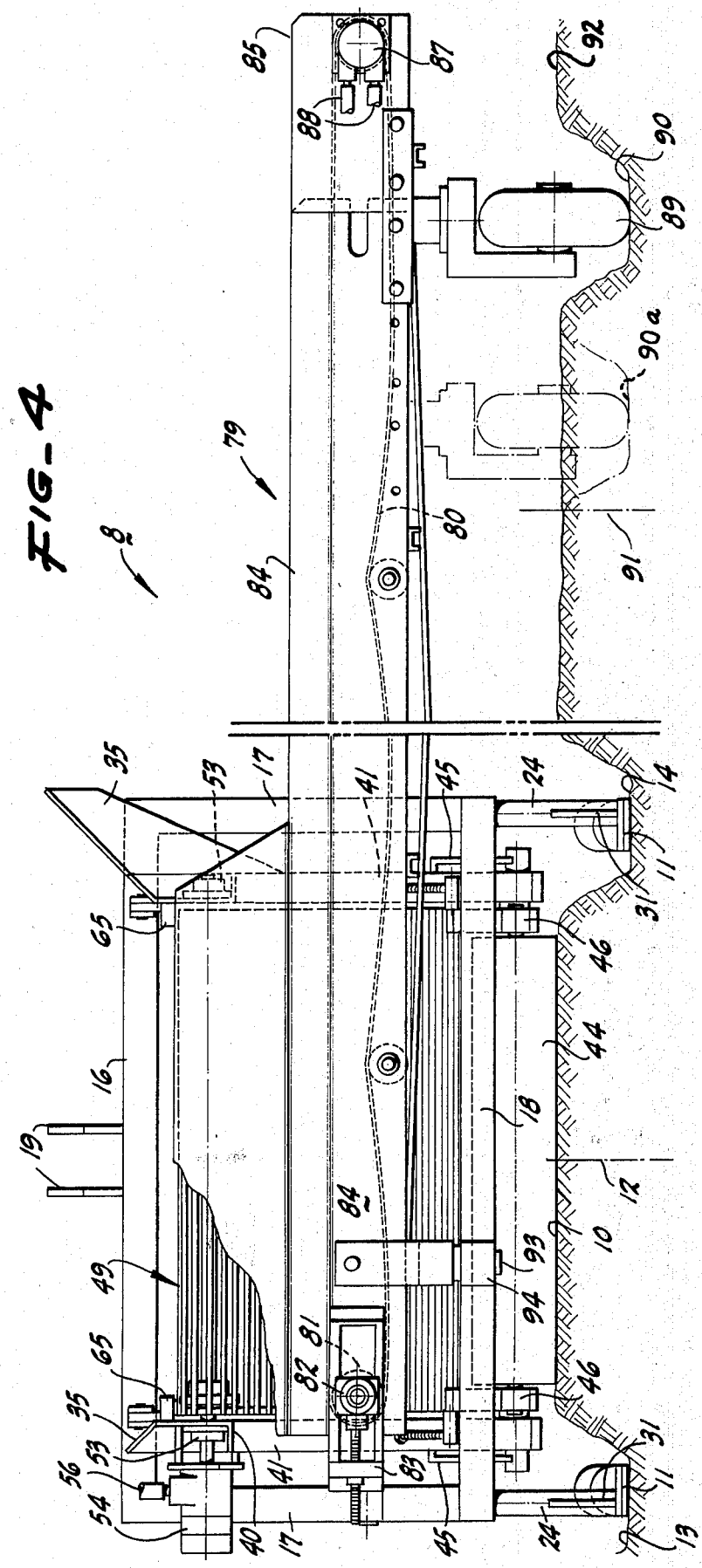

METHOD OF MECHANICALLY HARVESTING TOMATOES

BACKGROUND OF THE INVENTION

Mechanical tomato harvesters have established an important position in the harvesting art. Almost all cannery tomatoes presently being grown in California, for example, are harvested by mechanical means.

In the early stages of mechanical tomato harvesting, empty boxes, or bins, were carried on the machine. When a bin was filled it was transferred to a suitable vehicle for removal to a staging area or receiving station.

More recently, bulk trailers have come into favor. A bulk trailer is located alongside the harvester and advances along the row being harvested in unison with the harvester. When a bulk trailer is filled, it is hauled away and replaced by an empty trailer. Handling is thereby minimized with a consequent improvement in product quality and reduction in costs.

One difficulty with the use of bulk trailers is that as the trailer moves alongside the harvester, the combined widths of the harvester, and the bulk trailer are such that a wide unobstructed avenue is required. Such a requirement can sometimes be met where the initial pass of the harvester is made along an outside row in the field to be harvested and where a path suitable for the bulk trailer is available next to the outside row.

In most cases, however, there is either no suitable path alongside the outside row or the most efficient harvesting pattern for the particular field dictates some other sequence. Where several harvesters are used in a single field, for example, it is frequently desirable to separate the harvesters into different areas in the field and have them harvest simultaneously so as to pick the entire crop at the time of optimum yield.

Efficient mechanical harvesting, in other words, can often most advantageously be achieved by providing one or more clear avenues, or paths, along which bulk trailers can be advanced while receiving the output of an adjacent harvester.

Prior art of interest in connection with harvesting methods is B. C. Thompson U.S. Pat. No. 3,090,183 dated May 21, 1963; and C. W. Hart U.S. Pat. No. 3,475,886 dated Nov. 4, 1969.

SUMMARY OF THE INVENTION

The invention relates to a method of mechanically harvesting a row crop, such as tomatoes, by cutting a row of plants and diverting the cut plants to a selected row of plants laterally removed from the cut row, the united plants being subsequently harvested by a mechanical harvester. By so cutting and so diverting in a predetermined pattern an unobstructed avenue is provided to facilitate the use of large bulk container trailers and high capacity mechanical harvesters. Repetition of the pattern in a large field at appropriate locations enables a plurality of harvesters to operate in the field simultaneously and thereby effect harvesting of the entire crop at the optimum time.

The invention also relates to apparatus which advances along a row, cuts the growing plants in the row and transfers the cut plants to a laterally displaced row for the purpose of uniting the cut plants with the uncut plants for subsequent mechanical harvesting of the united plants.

It is an object of the invention to provide a harvesting method and apparatus for facilitating row crop harvesting, particularly of tomatoes, which reduces harvesting and overhead costs, improves tomato grade, reduces equipment, fuel and skilled labor requirements, eliminates all bins and bin equipment, simplifies field supervision, increases harvest efficiency, reduces equipment downtime, lowers trucking and processing cost and increases net return per acre to the grower.

It is another object of the invention to provide an improved method of harvesting and an improved apparatus for facilitating harvesting.

Other objects, together with the foregoing, are attained in the method and apparatus described in the following description and shown in the accompanying drawings.

BRIEF DESCRIPTION OF THE DRAWINGS

FIG. 2 is a vertical, longitudinal sectional view of an apparatus constructed in accordance with the invention, the plane of the section being indicated by the line 2—2 in FIG. 3;

FIG. 3 is a top plan view of the apparatus shown in FIG. 2;

FIG. 4 is a rear elevational view of the apparatus shown in FIG. 2; and,

FIG. 5 is a side elevational view.

Figure 1:
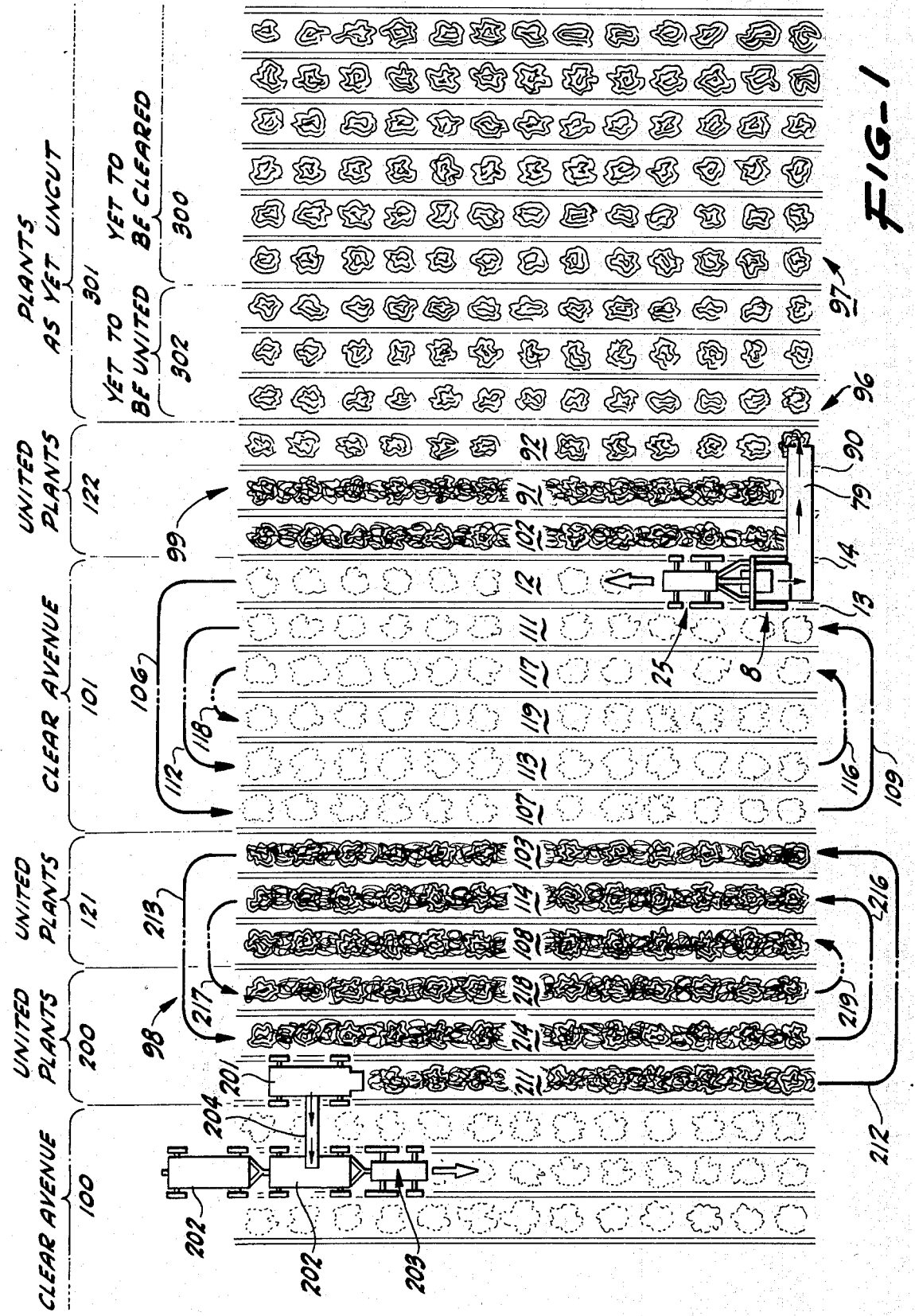
FIG. 1 is a schematic top plan view of a method of mechanically harvesting tomatoes pursuant to the invention.

While the apparatus of the invention is susceptible of numerous physical embodiments, depending upon the environment and requirements of use, and the method of the invention can be utilized in various ways, the apparatus shown and described herein has been utilized to perform the disclosed method with eminently satisfactory results.

The apparatus of the invention, generally designated by the reference numeral 8, includes a longitudinal, fore and aft frame 9 supported on ground engaging ski type skids 11 straddling a row 12 defined by trenches 13 and 14 (see FIG. 4).

The frame 9 comprises various conventional channel and box beam members including a forward upper cross-beam 16 and a pair of diagonals 17 extending rearwardly and downwardly to an after lower cross-beam 18.

Carried on the front of the forward upper cross-beam 16 is a pair of plates 19 providing one point of a three-point hitch for connection with a tractor 25 (see FIG. 1) of the high-clearance type. The other two hitch points include three parallel forwardly projecting plates 20 located on the forward ends of a pair of cantilevered beams 21 mounted on the two forward corner posts 22.

Vertical adjustment of the frame 9 relative to the ground 10 is effected by telescoping two pairs of lower pipes 24, mounted vertically on the skids 11, within two pairs of upper pipes 26 depending vertically from a pair of longitudinal horizontal beams 23. Registering openings 27 in the four sets of pipes 24 and 26, together with suitable cross-pins inserted through the registering openings, permits the frame 9 to be elevated or lowered, as desired.

Fore and aft rigidity of the frame 9 is augmented not only by the pair of horizontal longitudinal beams 23 spanning the forward vertical corner posts 22 and the diagonals 17, but also by a pair of fore and aft beams 28 extending between the after pair of upper vertical pipes 26 and the after lower crossbeam 18. Elongated, fore and aft gussets 31 strengthen the connection between the skids 11 and the after pair of lower vertical pipes 24.

As the tractor pulls the apparatus along the row, the plants 33 are cut by a knife 34 with V-blades 36. The knife 34 is mounted on the leading end of a fore and aft, square-in-section shank 37, adjustably anchored in a square-in-section socket 38 mounted on a transverse tubular beam 39. As appears most clearly in FIGS. 4 and 5, an inverted truncated triangular plate 45 is mounted on each end of the tubular cross beam 39; and on the fore and aft ends of each of the plates 45 is an adjustment screw 50 engaging the top of the fore and aft flange 40. By appropriately manipulating the screws 50, the angle of the tubular cross beam 39 and thus the angle of the knife 34 is adjusted.

The tubular cross-beam 39 is supported by pip bearings mounted on the bottom edges of a pair of rearwardly and upwardly sloping pair of channels 41 defining the lateral side edges of an upwardly sloping fore and aft conveyor, generally designated by the reference numeral 42. The side channels 41 of the conveyor 42 each includes an upwardly and outwardly inclined upper margin 35 and bottom flange 40.

As appears most clearly in FIG. 2, the fore and aft conveyor 42 is pivotally mounted on the diagonal beams 17 by suitable pair of pipe bearings 43, the angle of inclination being established by a pair of hydraulic cylinders 65 pivotally mounted on upper plates 67 on cross beam 16 and on lower plates 75 on the two conveyor channels 41. A safety chain 55 in slotted keeper 57 prevents the lower leading end of the conveyor from dropping by accident.

The conveyor's forward, lower end, carrying the vine cutting knife 34, is also supported by a roller 44 engaging the ground surface 10 of the row (see FIGS. 2 and 4). The ends of the roller 44 are journaled in bearings 46 mounted on channels 47 journaled at their forward ends on the tubular cross-beam 39 (see FIGS. 2 and 5). The after ends of the channels 47 are supported by a pair of threadably adjustable stems 48 mounted on the bottom flanges 40 of the side channels 41. By adjusting the stems 48, the position of the roller 44 relative to the conveyor can be established at the optimum depending upon ground condition and the like.

A main, fore and aft, endless chain conveyor 49 of one of the several available varieties utilizing a plurality of transverse bars interlinked at their opposite ends, is driven by a pair of drive sprockets 51 mounted on a shaft 52. The shaft 52 is journaled in bearings 53 carried on the upper ends of the conveyor side channels 41. As appears most clearly in FIGS. 3 and 4, the shaft 52 is preferably rotated by a fluid motor 54 connected by appropriate hoses 56 to a fluid pump (not shown) on the towing tractor. Also located on the tractor within easy reach of the operator are suitable control valves (not shown) enabling the operator to start and stop the main chain conveyor 49 as desired. In operating mode, the upper run of the main chain conveyor 49 moves rearwardly and upwardly, in the direction indicated by the arrow 58, the upper chain run being supported by a pair of flanges 59 mounted on the inner walls of the opposite side channels 41 and projecting inwardly to carry the interlinked ends of the chain cross bars in a linear path, as shown.

As the main chain conveyor 49 rounds the drive sprocket 51 and heads downwardly and thence forwardly in the lower, return run in the direction indicated by the arrow 60, the chain is supported on its lateral margins by a pair of elastomeric support wheels 61 journaled in the conveyor side walls 41 or side channels.

At its forward, lowermost end, the main chain 49 is carried around on rollers 62 journaled in the side channels 41.

It has been found that performance of the fore and aft chain conveyor 42 is improved by the addition to the main chain conveyor 49 of a secondary chain, or keeper chain, generally designated by the reference numeral 64. In other words, as the apparatus advances along the row with the knife 34 severing the vines 33 just below ground level, the cut plants are almost immediately engaged by the main chain 49 as the main chain rounds the rollers 62 in the direction of the arrow 63 and starts to ascend rearwardly along the linear track provided by the straight flanges 59.

At about the same time, and in some cases slightly before, the upper portions of the cut plants are engaged by the lower run of the keeper chain 64 traveling in the direction indicated by the arrow 66.

The lower run of the keeper chain 64 is provided with sufficient bars to afford a relatively low catenary, as appears most clearly in FIG. 2. Thus, the lower run descends far enough to engage the tops of small vines as well as large ones.

By engaging the main stem portions of the cut plants in the center of the row all portions of the cut plants, including laterally extending branches, are "pulled" into the conveyor 42.

The keeper chain 64, or secondary chain, is driven by a pair of sprockets 68 mounted on a shaft 69 journaled in a pair of bearings 71 mounted on a pair of arms 72 secured on the outwardly flared upper margins 35 of the conveyor side channels 41. A fluid motor 70 with connecting hoses 30 and control valves rotates the shaft 69.

A first pair of support wheels 73 and a second pair of support wheels 74 carry the upper run of the keeper chain 64 on the return in the direction indicated by the arrow 66. In the interests of quietness and smoothness of operation, the wheels 73 and 74 are preferably made of an elastomeric material.

As is indicated most clearly in FIG. 3, the secondary chain 64 is somewhat narrower in width than the main chain 49 since it is only necessary that the main stem portions of the vines be securely clutched by the two cooperating chains 49 and 64. Once the main stem portion is siezed and commences to travel up the conveyor, the attendant branches of the vine will follow. By the time the vine emerges from the upper end of the passageway 76 formed by the respective upper and lower chains 64 and 49, no further resistance is offered and the vine progresses to the upper after end of the fore and aft conveyor 42 and there spills over the end and falls downwardly into a hopper shaped receiver which guides the descending vines onto the beginning end 78 of a transverse conveyor, generally designated by the reference numeral 79.

The transverse conveyor 79 is of the type utilizing an endless belt 80 carried at one end by a roller 81 journaled between bearings 82 carried by a conventional belt tensioner 83 adjustably mounted on a pair of elongated side plates 84. The side plates 84 extend from the beginning or intake end 78 of the transverse conveyor 79 to a remote discharge end 85. At the discharge end 85 the endless belt 80 is carried on a drive roller 86 driven by a fluid motor 87 with hoses 88 connected to the tractor.

At the remote end 85, the transverse conveyor 79 is supported by a ground engaging wheel 89, preferably of the dirigible type. As appears most clearly in FIG. 4, the wheel 89 rides in a trench 90 between two adjacent rows 91 and 92. As will subsequently be described in detail, the location of the row 92 which receives the vines discharged from the conveyor end 85 is located a predetermined distance from the row 12 of the vines being cut by the blade 34. In the event that narrower rows are used, the dirigible wheel 89 can be relocated to the position shown in broken line in FIG. 4, with the wheel riding in trench 90a, closer to the machine.

The beginning end 78 of the transverse conveyor 79 is pivotally mounted on a pin 93 carried on a support bar 94 extending rearwardly from the after, lower cross-beam 18 of the conveyor frame 9. The pin mounting 93 enables the transverse conveyor 79 to be swung around into fore and aft alignment with the conveyor frame 9 for highway towing. When the conveyor 79 is placed in transverse operational orientation, as most clearly appears in FIG. 3, a suitable locking bar 100 is utilized to maintain the conveyor in the desired location, namely, at 90° to the forward path of the machine.

In accordance with the method of the invention, now to be described, the apparatus 8 of the invention is positioned at one end 96 of a field 97 including a plurality of rows 98 of a growing crop, such as tomatoes, ready to be harvested by a mechanical harvester. The rows extend from one end 96 of the field 97 to the other end 99.

The field can be of any width and in many instances it is desirable to repeat the predetermined pattern set forth herein at suitable intervals across the width of the field to enable a plurality of mechanical harvesters to be operating at the same time, thereby often enabling the entire crop to be harvested during the relatively short time of peak, or optimum, yield.

As shown in FIG. 1, previously cleared avenue 100 and 101 can accommodate a harvester 201 and attendant trailers 202 with towing tractor 203. The vine diverting apparatus 8 travels faster than the harvester, thereby enabling one vine diverter to clear several avenues ahead while harvesting proceeds.

The harvesting pattern now to be described in based upon the presumption that clear, unobstructed avenues 100 and 101, each approximately thirty feet in width, provide a most satisfactory passageway for movement of the mechanical harvester and accompanying vehicles during the harvesting operation. Since the width of most rows of tomatoes are about 5 to 5½ feet, six rows provide an avenue width of about 30 feet.

Customarily, a mechanical harvester 201 discharges its load of tomatoes from a transverse elevator type conveyor 204 extending from the harvester's right-hand side. One or more bulk trailers 202 being towed along the previously cleared avenue 100, for example, are therefore located on the right-hand side of the harvester so as to receive the tomatoes being discharged from the transverse elevator 204. At the end of the initial pass along the first row 211, the harvester and trailers can both be turned toward the left in the direction of the arrow 212, the turning circle of the combined pieces of equipment being such that on the return, or second pass, the harvester is aligned with the boundary row 103 located on the left-hand side of the cleared avenue 101. As the harvester advances along the row 103 from near end 96 to far end 99, the cleared avenue 101 provides an unobstructed path for the tractor 203 and bulk trailers 202 moving along with the harvester 201.

As will subsequently be described, harvesting of the six rows of united plants 200 and 121 continues until all are harvested, at which juncture the harvester can be moved so as to harvest the three rows of united plants 122 and the three rows in block 302 which will have been united by the apparatus 8 by the time the harvester is ready for them.

In order to create the clear avenue 101 pursuant to the method of the invention, the plant cutting and diverting apparatus 8 for facilitating the harvest is located at the beginning end 96 of the field 97 with the skids 11 disposed in alignment with the trenches 13 and 14 and the support roller 44 in ground engaging relation with the ground 10 of beginning row 12, as appears most clearly in FIGS. 1 and 4.

FIG. 1 illustrates schematically not only the initial position of the tractor 25 and the vine diverting apparatus 8 of the invention, preparatory to advancing along the first row 12 of vines to be cleared; but it also shows the appearance of the six row wide clear central avenue 101 as it appears at the conclusion of the vine diverting operation, the position of the plants originally located in the clear avenue 101 being indicated in broken line.

It is carefully to be noted that at the conclusion of clearing avenue 101, the vine diverter 8 will have been moved from clear avenue 101 into yet to be cleared block 300 and will not be in the position shown in FIG. 1, which indicates the initial position of the diverter. So also, when avenue 101 is entirely cleared, the plants in row 92 will be doubled up, or united, with the cut plants laterally transferred from row 12. As noted above, FIG. 1 shows the diverter 8 in starting position, with only the beginning of the row 92 being shown as united with cut plants from the start of row 12.

The operational sequence from start to finish in clearing avenue 101 will now be described.

As can be seen from the location of the tractor 25 and apparatus 8 in FIG. 1, the initial pass from one end 96 of the field 97 to the other end 99 is along row 12. Vines cut in row 12 in the initial pass are transferred laterally to the right by the conveyor 79. The conveyor 79 is long enough to deposit the cut vines on the plants located in row 92, that is to say, a row which is thrice removed from the row 12 being cut.

Upon reaching the far end 99 of row 12, the apparatus 8 is swung around to the left, along the path indicated by the arcuate arrow 106, and returns to the near end 96 of the field along a row 107. While traversing the row 107, the cut plants are transferred by the machine to row 108 which is thrice removed to the right when the apparatus is on a return path from end 99 to end 96 along row 107.

At the near end 96 of row 107, the machine is swung to the left along the arc 109 and is headed into row 111. As the machine moves ahead in row 111, the cut vines are transferred, as before, to a row thrice removed from the row being cut. In this instance, the cut plants from row 111 are deposited on and united with the uncut plants growing in row 91, a row which is twice removed from original row 12.

Upon reaching the nether end 99 of row 111, the tractor hauls the apparatus to the left along the arcuate path 112 and enters row 113, the cut plants being deposited on and united with the plants in row 114, a row which is thrice removed from the row 113 being cut and twice removed from the row 107 which was cut on the first return pass.

At the near end of row 113, the apparatus follows the arcuate path 116 and enters row 117. This marks the last outward pass and serves to transfer cut vines onto row 102, the row adjacent row 12 down which the initial pass was made.

As the machine completes row 117, it makes a sharp turn to the left, as indicated by the arrow 118, and enters row 119 for the final return pass. In moving along row 119, cut vines are united with the uncut vines in row 103, a row which is once removed from the first return row 107.

As the apparatus leaves the near end 96 of the sixth cleared row 119, it can be moved to another location either on the same field 97, such as into the block 300, or to another location, to repeat the avenue clearing and vine unification cycle according to the predetermined pattern just described.

Having provided a clear central avenue 101 down the middle of three left-hand rows 121 of united plants and the three right-hand rows 122 of united plants, the field 97 is ready for harvesting by the high capacity mechanical harvester 201, as will now be described.

The initial pass made by the harvester 201 might conveniently be made, as previously indicated, along row 211, from the far end 99 of the field 97 to the near end 96, the harvester being driven at a speed which enables it to handle the double yield rows.

Upon reaching the near end 96 of the field, the harvester and the attendant bulk trailers are swung around to the left in the path 212 so that the harvester's return pass can be made along united crop row 103, with the tractor and trailers moving approximately along cleared row 113. At the far end 99 of row 103, the harvester swings to the left, following the path 213, and heads down row 214, at the end of which it turns along the path 216 and enters row 114. At the end 99, the harvester then moves along path 217 to harvest row 218, from which it turns along path 219 to harvest the last row 108 of the six rows, i.e. three rows 200 plus three rows 121, of united plants.

Having cleared avenues 100 and 101, the vine diverting apparatus 8 can, as previously mentioned, proceed to clear the block 300 in the portion of the field 97 in which there are plants as yet uncut, indicated generally by the reference numeral 301. After the plants in block 300 have been cut and diverted pursuant to the cycle previously explained, the three rows of plants indicated by reference numeral 302 will be doubled, at which juncture the three united rows 122 and the three united rows 302 can be harvested in the manner previously described for united rows 200 and 121.

As will be realized, it is not necessary that the cleared avenues 100 and 101 be spaced apart precisely as shown. Circumstances might dictate that more or less than six rows be arranged in the alternating pattern shown; and in such cases the length of the transverse conveyor 79 can be adjusted accordingly. It has been found, however, that for tomatoes in rows which are 5 to 5½ feet in width, and for present day harvesting equipment, the apparatus and method disclosed herein provide beneficial results.

It can therefore be seen that by following a predetermined sequence in cutting growing plants and uniting the cut plants in a preselected pattern, with uncut plants in laterally displaced rows, a mechanical harvester and attendant bulk trailer can quickly and conveniently harvest the crop from a substantial number of rows. The unobstructed avenues afforded by the vine diverting apparatus facilitate the movement and operation of the large harvester and bulk containers and enhance harvesting speed and efficiency with a minimum of effort.

What is claimed is:
1. A method of mechanically harvesting tomatoes from a tomato field in which the tomato plants grow in a plurality of substantially parallel rows extending from one end to the other end, said method comprising the steps of:
   a. making an initial pass along a first predetermined one of said rows from said one end toward said other end;
   b. cutting the tomato plants in said first predetermined row while making said initial pass;
   c. transferring the cut plants from said first predetermined one of said rows to a second predetermined one of said rows laterally displaced from said first predetermined one of said rows;
   d. uniting the cut plants from said first predetermined one of said rows with the plants in said second predetermined one of said rows; and,
   e. harvesting the united plants.
2. A method as in claim 1 in which said second predetermined one of said rows is thrice removed from said first predetermined one of said rows.
3. A method as in claim 1 in which said second predetermined one of said rows is removed to the right from said first predetermined one of said rows while making said initial pass.
4. A method as in claim 1 further characterized by the steps of making a second pass along a first selected one of said rows from said other end toward said one end; cutting the tomato plants in said first selected one of said rows while making said second pass; transferring the cut plants from said first selected one of said rows to a second selected one of said rows laterally displaced from said first selected one of said rows; uniting the cut plants from said first slected one of said rows with the plants in said second selected one of said rows; and harvesting the united plants.
5. A method as in claim 4 in which said second selected one of said rows is thrice removed from said first selected one of said rows.
6. A method as in claim 5 in which said second selected one of said rows is removed to the right from said first selected one of said rows while making said second pass.
7. A method as in claim 4 further characterized by the steps of making a third pass along a third predetermined one of said rows from said one end toward said other end, said third predetermined one of said rows being adjacent said first predetermined one of said rows; cutting the tomato plants in said third predetermined row while making said third pass; transferring the cut plants from said third one of said predetermined rows to a fourth predetermined one of said rows laterally displaced from said third one of said predetermined rows; uniting the cut plants from said third predetermined row with the plants in said fourth predetermined one of said rows; and harvesting the united plants.

8. A method as in claim 7 in which said fourth predetermined one of said rows of said plants is thrice removed from said third predetermined one of said rows.

9. A method as in claim 8 in which said fourth predetermined one of said rows is removed to the right from said third predetermined one of said rows while making said third pass; and in which said fourth predetermined one of said rows is twice removed from said first predetermined one of said rows.

10. A method as in claim 7 further characterized by the steps of making a fourth pass along a third selected one of said rows from said other end toward said one end, said third selected one of said rows being adjacent said first selected one of said rows; cutting the tomato plants in said third selected one of said rows while making said fourth pass; transferring the cut plants from said third selected one of said rows to a fourth selected one of said rows laterally displaced from said third selected one of said rows; uniting the cut plants from said third selected one of said rows with the plants in said fourth selected one of said rows; and harvesting the united plants.

11. A method as in claim 10 in which said fourth selected one of said rows is thrice removed from said third selected one of said rows.

12. A method as in claim 11 in which said fourth selected one of said rows is removed to the right from said third selected one of said rows while making said fourth pass; and in which said fourth selected one of said rows is twice removed from said first selected one of said rows.

13. A method as in claim 10 further characterized by the steps of making a fifth pass along a fifth predetermined one of said rows from said one end toward said other end said fifth predetermined one of said rows being adjacent said third predetermined one of said rows; cutting the tomato plants in said fifth predetermined one of said rows while making said fifth pass; transferring the cut plants from said fifth predetermined one of said rows to a sixth predetermined one of said rows laterally displaced from said fifth predetermined one of said rows; uniting the cut plants from said fifth predetermined one of said rows with the plants in said sixth predetermined one of said rows; and harvesting the united plants.

14. A method as in claim 13 in which said sixth predetermined one of said rows is thrice removed from said fifth predetermined one of said rows.

15. A method as in claim 14 in which said sixth predetermined one of said rows is removed to the right from said fifth predetermined one of said rows while making said fifth pass; and in which said sixth predetermined one of said rows is once removed from said first predetermined one of said rows.

16. A method as in claim 13 further characterized by the steps of making a sixth pass along a fifth selected one of said rows from said other end toward said one end, said fifth selected one of said rows being adjacent said third selected one of said rows; cutting the tomato plants in said fifth selected one of said rows while making said sixth pass; transferring the cut plants from said fifth selected one of said rows to a sixth selected one of said rows laterally displaced from said fifth selected one of said rows; uniting the cut plants from said fifth selected one of said rows with the plants in said sixth selected one of said rows; and harvesting the united plants.

17. A method as in claim 16 in which said sixth selected one of said rows is thrice removed from said fifth selected one of said rows.

18. A method as in claim 17 in which said sixth selected one of said rows is removed to the right from said fifth selected one of said rows while making said sixth pass; and in which said sixth selected one of said rows is once removed from said first selected one of said rows.

* * * * *